United States Patent [19]

Sawyer

[11] Patent Number: 4,956,316
[45] Date of Patent: Sep. 11, 1990

[54] PROCESS FOR DISPERSING SILICON CARBIDE WHISKERS

[75] Inventor: Linda C. Sawyer, Chatham, N.J.

[73] Assignee: Hoechst Celanese Corp., Somerville, N.J.

[21] Appl. No.: 185,676

[22] Filed: Apr. 25, 1988

[51] Int. Cl.$^5$ .................. C04B 35/56; C04B 35/58; C04B 35/76; C04B 35/10
[52] U.S. Cl. ........................................ 501/88; 501/89; 501/92; 501/95; 501/97; 501/98; 264/63
[58] Field of Search .................. 501/88, 89, 92, 95, 501/97, 98; 264/63

[56] References Cited

U.S. PATENT DOCUMENTS

| 4,543,345 | 9/1985 | Wei | 501/95 |
| 4,560,526 | 12/1985 | Okumura | 501/88 |
| 4,569,886 | 2/1986 | Divecha | 428/379 |
| 4,657,877 | 4/1987 | Becher | 501/89 |
| 4,789,277 | 12/1988 | Rhodes et al. | 501/89 |
| 4,840,763 | 6/1989 | Freitag | 501/95 |

FOREIGN PATENT DOCUMENTS 3409385 3/1984 Fed. Rep. of Germany .

OTHER PUBLICATIONS

"Determination of Fiberglass Lengths: Sample Preparation and Automatic Image Analysis", L. C. Sawyer, reprinted from *Polymer Engineering and Science*, vol. 19, No. 5, Apr. 1979, pp. 377–382.
"Toughening Behavior in SiC-Whisker-Reinforced Alumina", Paul F. Becher and George C. Wei, *Communications of the American Ceramic Society*, Dec. 1984, pp. 267–269.
"Whisker-Reinforced Ceramic Matrix Composites", J. Homeny and W. L. Vaughn, *MRS Bulletin*, Oct. 1/Nov. 15, 1987, pp. 66–71.
"SiC-Whisker-Reinforced Si$_3$N$_4$ Composites", Robert Lundberg, Lars Kahlman, Robert Pompe and Roger Carlsson, *American Ceramic Society Bulletin*, 66[2] 330–33 (1987).
"Sintered Al$_2$O$_3$-SiC-Whisker Composites", Terry N. Tiegs and Paul F. Becher, *Ceramic Bulletin*, vol. 66, No. 2, 1987, pp. 339–342.
"Processing and Creep Performance of SiC-Whisker-Reinforced Al$_2$O$_3$", John R. Porter, Fred F. Lange and Atul H. Chokski, *American Ceramic Society Bulletin*, 66[2] 343–47 (1987).
"Processing and Mechanical Properties of SiC-Whisker-Al$_2$O$_3$-Matrix Composites", Joseph Homeny, Wallace L. Vaughn and Mattison K. Ferber, *American Ceramic Society Bulletin*, 67[2] 333–338 (1987).

*Primary Examiner*—Mark L. Bell
*Assistant Examiner*—David M. Brunsman
*Attorney, Agent, or Firm*—DePaoli & O'Brien

[57] ABSTRACT

Silicon carbide whiskers such as those used in reinforcing ceramic composites are deagglomerated by dispersing the whiskers in an aqueous silane dispersant comprising a silane containing nonreactive hydrocarbon groups and reactive hydrolyzable groups, a cationic lubricant and an acid to provide a dispersant pH of about 3.5 to about 6.0. The whiskers can be deagglomerated prior to mixing with the ceramic powder used to form the composite or the whiskers, ceramic powder and aqueous silane dispersant can be mixed simultaneously. Dispersal permits classification and selection of specific aspect ratio distributions for the ceramic composite. Deagglomeration permits use of higher vol. % SiC whiskers while still attaining greater than 99% density.

50 Claims, No Drawings

PROCESS FOR DISPERSING SILICON CARBIDE WHISKERS

Generally, the present invention relates to whisker-reinforced ceramic composites and the preparation thereof, and, more particularly, to such composites in which single crystal silicon carbide whiskers are more uniformly dispersed therein to provide improvements in the fracture toughness and fracture strength of the ceramic.

Recent emphasis has been placed upon the use of ceramic materials as structural components in heat engines and high-temperature conversion systems such as turbines. For the use of ceramic in such applications, fracture toughness of the material is a critical consideration. Conventional ceramic materials have relatively low fracture toughness with the exception of $Al_2O_3$-$ZrO_2$ and partially stabilized $ZrO_2$. Utilization of monolithic ceramic material such as SiC, $Si_3N_4$, $Al_2O_3$ and mullite ($3Al_2O_3\cdot 2SiO_2$) for the fabrication of structural components for use in heat engines and other high-temperature conversion systems has required the use of ceramic components with very small flaw size, e.g., less than about 50 $\mu m$, in order to provide acceptable fracture toughness. However, in structural components especially of complex configuration, the determination of such small flaw sizes has been very difficult to achieve by using nondestructive inspection techniques.

Efforts to overcome the lack of sufficient fracture toughness in ceramic material has included the development of fiber-reinforced composites For example, graphite fiber reinforced ceramics provide impressive fracture toughness and strength at ambient temperatures but these ceramic composites are found to be of questionable value when subjected to elevated temperatures because of the oxidation of the carbon fibers and the reaction between the carbon in the fibers and the constituents of the ceramic material On the other hand, the use of inorganic fibers such as silicon carbide (SiC) filaments and chopped fibers for reinforcing or strengthening ceramic material has exhibited some success but encountered several problems which considerably detracted from their use. For example, conventional silicon carbide filaments or chopped fibers are of a continuous polycrystalline structure and suffer considerable degradation due to grain growth at temperatures above about 1250° C., which severely limits their use in high temperature fabrication processes such as hot-pressing for producing ceramic composites of nearly theoretical density. Further, during high pressure loadings such as encountered during hot pressing, the polycrystalline fibers undergo fragmentation which detracts from the reinforcing properties of the fibers in the ceramic composite. Also, these polycrystalline fibers provide insufficient resistance to cracking of the ceramic composite since the fibers extending across the crack line or fracture plane possess insufficient tensile strength to inhibit crack growth through the composite especially after the composite has been fabricated by being exposed to elevated pressures and temperatures as in hot pressing.

The use of the single crystal silicon carbide whiskers in the ceramic composite, on the other hand, has been found to improve the fracture toughness of the ceramic composite due to the ability of the whiskers to absorb cracking energy. The whiskers appear to toughen the composites by crack deflection, as when a crack encounters the whisker, crack bridging and by whisker "pull-out". Whisker "pull-out" occurs during cracking of the ceramic matrix at the SiC whisker-matrix interface where shear strength is relatively low as provided by radial tensile stresses across the whisker-matrix bond. As a crack-front propagates into the composite, many of the whiskers which span the crack line and extend into the ceramic matrix on opposite sides of the crack must be either fractured or pulled out of the matrix in order for the crack to grow or propagate through the ceramic. Since the single crystal SiC whiskers possess sufficient tensile strength to resist fracturing, they must be pulled out of the matrix for the crack to propagate. As these whiskers are pulled out of the matrix, they exhibit considerable bridging forces on the face of the crack and effectively reduce the stress intensity at the crack tip so as to absorb the cracking energy. Whisker pull-out, accordingly, effectively reduces the tendency of the composite to crack and also inhibits crack propagation U.S. Pat. Nos. 4,543,345; 4,569,886 and 4,657,877 disclose silicon carbide whisker-reinforced ceramic composites.

Unfortunately, silicon carbide whisker-reinforced ceramic composites have only shown limited improvements in fracture toughness over the unreinforced ceramic. For example, alumina has a fracture toughness of about 4 MPa.m$^{\frac{1}{2}}$ while SiC whisker reinforced alumina has a fracture toughness of about 8-10 mPa.m$^{\frac{1}{2}}$. Continuous fiber alumina composites have a fracture toughness as high as 25 MPa.m$^{\frac{1}{2}}$. One possible reason for the unsatisfactory improvement is that the fracture strength of the composite is limited by the nonuniform distribution of the whiskers within the composite. Typical methods of mixing and dispersing the SiC whiskers within the ceramic powders involve mixing in a liquid medium such as alcohol or water with the use of a high shear ultrasonic homogenizer. More elaborate sedimentation techniques have also been used in an attempt to uniformly disperse the whiskers within the ceramic powder mix. Unfortunately, due to the size and shape of the whiskers, and particularly to the broad aspect ratio distribution and large aspect ratios (length/width) the whiskers as received and as produced are found as agglomerates and form clumps often called "nests". None of the mixing techniques has found much success in providing a homogeneous dispersion of the whiskers in the ceramic matrix Agglomeration of the whiskers and the consequent local nonuniform densification of the composite are still observed, which result in large defects in the composite and/or regions of low fracture toughness. Additionally, in view of the severe whisker clumping which takes place and difficulty in forming a uniform mix of whiskers and ceramic powder, reduced levels of the whiskers must be used to form the ceramic composites. Obviously, substantial improvements in fracture toughness of the ceramic cannot be obtained if there is an insufficient amount of whisker loading.

Another disadvantage found with using whiskers in ceramic composites is that commercially available whiskers have a wide range of sizes exemplified by aspect ratios ranging from about 5 to 90 in a single batch. In view of the characteristic of the whiskers to readily clump, classification or separation of the whiskers according to size is extremely difficult if at all possible. If the whiskers could be provided within a narrower range of aspect ratios, this may reduce clumping, provide for increased loading levels of whiskers in the composite and allow only whiskers of optimum size to be included in the composite. Classification of the whiskers, however, cannot be accomplished without good whisker deagglomeration and dispersion.

Accordingly, improvements in whisker dispersion would be expected to provide for improvements in the strength and toughness of SiC whisker-reinforced ceramic composites. Such improvements form the basis and primary objective of the present invention.

SUMMARY OF THE INVENTION

In accordance with the present invention, a process for dispersing silicon carbide whiskers is provided in which vast improvements in deagglomeration of the silicon carbide whiskers and improved dispersion are obtained. The improved dispersion of the silicon carbide whiskers is achieved by dispersing the whiskers in an aqueous dispersant fluid comprising a silane of formula I, a cationic lubricant and an acid to adjust pH. The silane used in the dispersant has a structural formula as follows:

$$R_n\text{-SiX}_{4-n} \quad (I)$$

wherein R is a nonfunctional hydrocarbon group, preferably alkyl, X is a hydrolyzable group, preferably alkoxy, and n is an integer from 1 to 3.

It is believed that the silane as depicted in formula I reacts with silicon, silicon oxide, or silicon oxycarbide and, thus, forms a surface film on the SiC whisker to act like a protective colloid, limiting adhesion and keeping the whiskers apart. The nonfunctional group on the silane does not act as a coupling agent and does not react with itself or the whisker surface. The cationic lubricant is believed to provide the whisker surface with a low surface tension and hydrophobic properties which are believed important to achieving the good dispersion of the whiskers Generally, ceramic composites can be formed by mixing the ceramic in powder form with 5 to 60 vol. % of the silicon carbide whiskers The whiskers can be mixed with the ceramic powder and aqueous dispersant simultaneously or the whiskers may be dispersed first, dried and then mixed with the ceramic powder. One advantage to the latter process is that the dispersed whiskers can be separated accordingly to size and aspect ratio by classification techniques prior to mixing. In any case, with the ability to provide satisfactory dispersion of the whiskers and deagglomeration, whisker loadings of at least 20 vol. % and substantially higher are readily obtainable. With the higher loadings of SiC whiskers, significant improvements in fracture toughness of the ceramic composites can be achieved. The ceramic composites are prepared by hot-pressing the homogeneous mixture of particulate ceramic material and silicon carbide whiskers or by molding the composite such as by extrusion molding or injection molding wherein a small addition of an organic binder is added to the mix of ceramic particles and whiskers.

DETAILED DESCRIPTION OF THE INVENTION

As generally described above, the present invention is directed to a process for dispersing silicon carbide whiskers and, in particular, to uniformly dispersing the silicon carbide whiskers in a ceramic matrix to form a whisker-reinforced ceramic composite of improved fracture toughness.

In accordance with the present invention, the silicon carbide whiskers are dispersed with the aid of an aqueous silane dispersant which includes a silane, a cationic lubricant and an acid. The whiskers can be deagglomerated in the silane dispersant first and then added to a mix of ceramic particles used to form the composite or, the ceramic particles, silicon carbide whiskers and the aqueous silane dispersant can be simultaneously mixed. Once formed and dried, if necessary, the mixture is hot-pressed, extruded or molded in a conventional manner to form a ceramic-SiC whisker composite article.

The ceramic material found to be particularly useful for fabricating the ceramic composites of the present invention includes $Al_2O_3$, mullite ($3Al_2O_3.2SiO_2$), $B_4C$, $Si_3N_4$, cordierite ($2MgO.2Al_2O_3.5SiO_3$), $Al_2O_3.ZrO_2$, $ZrO_2$, $Si_3N_4$ (with $Al_2O_3$ and $Y_2O_3$ dopants), and SiC (doped with B and C). This list of ceramic materials is not an attempt to limit the invention and, thus, any and all ceramic materials which can be converted into powders may find use in the present invention.

The SiC whiskers used in the present invention are single crystals containing alpha, beta and mixed alpha and beta phases of silicon carbide The average diameter of the whiskers is about 0.6–2 microns and the length about 10–80 microns. It is preferred that the aspect ratio of the whiskers be less than about 30. Most preferred are SiC whiskers with aspect ratios between about 5 to 20.

The whisker content in an average lot of a typical commercial whisker product is 80-90% with the rest being formed of silicon carbide powders. Chemical analysis of the whiskers typically show major impurities of oxygen: 0.1 wt. %; Mn, Mg, Fe, Al: 0.1–0.8 wt. %; Cr, K, Cu, Ni, Na: 100–1,000 ppm. SiC whiskers are manufactured from rice hulls and are commercially available as grade F-9, formerly known as ARCO SC-9 whiskers from Advanced Composite Materials Co., Greer, S.C. or under the trademark "Tokamax" obtainable from Tokai Carbon Company, Tokyo, Japan, which has a sales office in New York, NY. American Matrix, Inc., Knoxville, Tenn. and Tateho Chemical Ind., Kariya, Japan also market SiC whiskers. Other commercial sources of SiC whiskers are available. Because of the high purity of the SiC whiskers they are stable at temperatures up to 1800° C. in inert gases. Also, the thermal stability of the SiC whiskers in ceramic matrices at processing temperatures up to about 1900° C. provides a distinct advantage over continuous polycrystalline SiC fibers that typically degrade due to grain growth above about 1200° C. The invention is not intended to be limited to treatment of silicon carbide whiskers formed in any particular manner. Thus, any silicon carbide whisker, regardless of how manufactured, is believed to be beset by the disadvantages expressed previously and would benefit from the process of this invention. Moreover, in its broadest aspect, it is believed the deagglomeration process of this invention is applicable to any silicon-containing whisker including silicon carbide, silicon nitride, etc. It is theorized that it is the silicon moiety of the whisker which is reactive with the dispersant and controls the deagglomeration phenomena found with the dispersant of the invention. The theory of deagglomeration is discussed shortly below.

The aqueous dispersant of the present invention which permits deagglomeration of the SiC whiskers and, thus, the homogeneous dispersion of the whiskers in the matrix of the ceramic composite comprises a silane which is defined below, a cationic lubricant and an acid to control the pH of the dispersant.

The silane which is used in the dispersant has the formula:

$$R_n SiX_{4-n}$$

wherein R is a nonfunctional hydrocarbon group, X is a hydrolyzable group, and n is an integer from 1 to 3.

Preferably the hydrocarbon group R is selected from lower alkyl, aryl, lower alkylaryl or lower arylalkyl. Especially preferred is when R is methyl, ethyl or propyl. The hydrolyzable group X can be represented by the formula —OR' wherein R' can be hydrogen, lower alkyl, aryl, lower alkylaryl or lower arylalkyl. Preferably X is a lower alkoxy group such as methoxy, ethoxy or propoxy. A particularly preferred silane is methyltrimethoxysilane.

While not wishing to be bound by any theory, it is believed that the hydrolyzable groups X react with the whisker surface. The nonreactive hydrocarbon group R, however, does not react and is believed to keep the whiskers apart. This theory has also been expressed by the inventor in an article directed to separating glass fibers for automatic image analysis and entitled "Determination of Fiberglass Lengths: Sample Preparation and Automatic Image Analysis", L.C. Sawyer, Polymer Engineering and Science, Vol. 19, No. 5, April 1979.

The cationic lubricants used in the dispersant of this invention are those which are commonly used in the fiberglass industry, typically as an addition to a sizing composition, to provide hydrophobic properties to the surface. Again, it is speculated that the silicon carbide whisker surface (oxides) behave similarly to glass fiber surface (oxides) and show an affinity for cationic groups or ions. Most of the commercial lubricants are cationic surface-active agents in which the cationic group is usually an amine, amide or a quaternary ammonium group to which a fatty acid or other lubricating group is attached. Most of these cationic lubricants are sold under tradenames in which only a general chemical description of the material is known. Below are a few examples of cationic lubricants which can be used together with the manufacture of origin and chemical identification:

ble to utilize cationic silanes which include a lubricating moiety. An example of such a cationic silane is Dow Corning Z6032 which has the structural formula

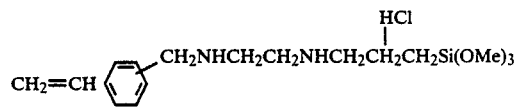

The acid which is used to adjust the pH of the aqueous dispersant is not critical as both mineral acids and organic acids are useful. A preferred acid is acetic acid.

The dispersant is comprised of an aqueous solution of the silane, cationic lubricant and acid. The aqueous dispersant comprises about 0.05 to 1 wt. %, preferably about 0.05 to 0.25 wt. % silane, 0.05 to 1 wt. %, preferably about 0.05 to 0.25 wt. % of the cationic lubricant and sufficient acid to provide for a dispersant pH of about 3.5–6.0. It is preferred that the weight ratio of silane to cationic lubricant be about 1:1 although substantial variance is possible depending on the silane and lubricant materials used. A preferred method of forming the aqueous silane dispersant comprises mixing 0.25% of the silane, 0.25% of the cationic lubricant, water and sufficient acid to provide a dispersant pH of 4.0. This whiskers, ceramic powder and aqueous silane dispersant can be mixed to deagglomerate the whiskers and uniformly disperse the whiskers throughout the ceramic. Subsequent removal of the water provides a homogeneous whisker-ceramic powder blend ready for shaping.

Regardless of whether the whiskers are first dispersed or deagglomerated in the aqueous silane dispersant or whether the whiskers and ceramic powder are dispersed and deagglomerated in the aqueous silane dispersant, a coating of the dispersant will be formed on the whiskers. If deagglomerated in the dispersant prior to mixing with the ceramic powder, on drying, the coated whiskers are substantially non-tacky and relatively free-flowing and provided with a greater resistance to agglomerate or nest. Whether the whiskers are deagglomerated in the dispersant prior to or simultaneously with mixing in the ceramic powder, during formation of the ceramic composite such as by hot-pressing or by molding and subsequent sintering, the

| Material | Manufacture | Chemical Type |
|---|---|---|
| Ethomeen CA 15 | Armour Industrial Chem. Co., Chicago (U.S.A.) | Oxyethylated amine |
| Arquad S 50 | Armour Industrial Chem. Co., Chicago (U.S.A.) | Alkyl trimethyl ammonium chloride |
| Cationic X | Onyx Chem. Co., Jersey City, N.J. (U.S.A) | Alkyl imidazoline derivative |
| Cirrasol 185A | I.C.I. (America) Inc. | Pelargonate amide |
| Cirrasol 220 | I.C.I. (America) Inc. | Tetraethylene pentamine derivative |

The cationic lubricant is activated under acidic conditions and, thus, it is important that the dispersant be prepared at an acidic pH, e.g., 3.0–4.5. Often the lubricants are difficult to get into aqueous solution and, thus, a substantial heating period may be needed to dissolve the lubricant. Once the lubricant is dissolved in the acidic aqueous solution, additional water can be added to provide for the optimum concentrations of the silane and lubricant to achieve deagglomeration of the silicon carbide whiskers.

While it has been disclosed that the silane and the cationic lubricant are separate materials, it may be possicoating will be converted to a carbide. The carbide coating is much preferable to the surface oxide coating which is on the whiskers and also which readily forms on the whiskers as they are stored in an oxygen containing atmosphere. The carbide coating is much less likely to react with the surrounding ceramic matrix and will enhance whisker pull-out of the matrix during crack-forming stresses. dispersant is then diluted with water in a ratio of dispersant to water of 1:1 to 5.

In accordance with the invention, the silicon carbide whiskers can be dispersed in the aqueous silane dispersant prior to or simultaneously with the addition of the ceramic powder. The mixing of the aqueous silane dispersant with the whiskers or with the whiskers and ceramic powders is typically done with agitation such as by ultrasonic homogenation. By deagglomerating the whiskers in the aqueous silane dispersant prior to mixing with the ceramic powders, the whiskers can be classified according to size and/or aspect ratio by any classification technique. Thus, the wide size variance of the whiskers provided in a typical batch of commercially provided whiskers can be narrowed significantly. It is believed that a more narrow whisker size distribution enhances deagglomeration of the whiskers and consequent improvement in fracture toughness of the formed ceramic composite and, thus, it is the preferred method to deagglomerate the whiskers, classify and then mix the whiskers with the ceramic powder. If the whiskers are first deagglomerated in the aqueous silane dispersant and then dried, mixtures thereof with the ceramic powders can be formed by ball-milling or by blending such as in a high shear Waring blender. Additional aqueous silane dispersant and/or other known dispersants such as water and alcohols may be added during the mixing with the ceramic powder. Alternatively, the The concentration of the SiC whiskers in the composites will range from about 5 to 60 vol. % and preferably about 15–40 vol. % with about 20–40 vol. % providing the best results. With SiC whisker concentrations greater than about 60 vol. %, considerable whisker clumping may occur which detracts from the composite toughness. With less than about 5 vol. % whiskers, insufficient toughness is achieved due to the low concentration of the SiC whiskers in the matrix which will expose an insufficient number of whiskers in the crack plane to adequately absorb the cracking energy.

It has been found that ceramic matrix powders in a size range of about 0.05 to 1.0 micron are especially preferred to form the homogeneous mixture since the tendency of whiskers to agglomerate is less with these fine powders. Ceramic matrix powders of less than 0.5 micron are especially preferred. However, with the improved aqueous dispersant of this invention, it is expected that agglomerate-free homogeneous mixtures can be provided with ceramic powders up to about 44 microns (−325 mesh).

Upon completing the mixing operation, the mixture is formed into a suitable article configuration. Any known shaping technique can be used including dry composition methods and extrusion and injection molding. Hot pressing provides composites with essentially the full theoretical density of the ceramic. Composites with greater than about 99% of the theoretical density of the ceramic matrix material obtain the maximum toughness with the minimum presence of porosity and other flaws which detract from the toughness of the composite. High density is also required from the standpoint of strength.

The hot pressing step may be achieved in a suitable induction or resistance heated furnace with punches or pressing components formed of graphite or any other suitable material which is capable of withstanding the required pressures and temperatures without adversely reacting with the composite constituents. The pressing, for example, can be achieved in a vacuum furnace at temperatures ranging from about 1600° to 1950° C and at pressures in the range of about 28 to 70 MPa for about 0.75 to 2.5 hours depending upon the matrix material. During the hot pressing step, a pressing pressure of about half of the predetermined total pressure is applied to the composite until the composite reaches the desired hot pressing temperature, then full pressure can be applied. Densification of the composite may be monitored by a linear variable displacement transducer attached to the top ram of the press.

To produce ceramic articles having more complex shapes, an injection molding technique is useful. In this method, the mix of ceramic powder and whiskers is provided with a decomposable organic binder which acts as a fluidizing agent. The moldable ceramic compositions will include an amount ranging from about 15 to 50% preferably from about 20 to about 35% by weight of the total mixture of the organic binder which serves to maintain the integrity of the shaped article prior to sintering. A preferred binding agent is a polyacetal having oxymethylene recurring units. The term "polyacetal" and the recurring unit should be understood to encompass both homopolymers and copolymers. Details of a useful polyacetal binder are disclosed in U.S. Pat. No. 4,624,812. The polyacetals are per se known in the art. For example, polyacetals commercially available under the registered trademark Celcon may be prepared by polymerizing anhydrous formaldehyde or trioxane in accordance with the teachings of U.S. Pat. No. 3,027,352, the contents of which are hereby incorporated by reference.

Other binders are known including polyolefins such as polyethylene and polypropylene, polystyrene, acrylic rubbers, nylon, and the like. Thermosets may also be used including epoxy and phenol-formaldehyde resin systems.

The binding agent may also be comprised of small amounts of from about 1.0 to about 10% of known materials which serve an additional binding function. Such materials include low density polyethylene, atactic polypropylene, ethylene vinyl acetate and waxes such as stearic acid and paraffin wax.

Moldable ceramic compositions may further contain conventional amounts of wetting agents, plasticizers and other types of processing aids which are added to the composition to obtain a suitable rheological system for molding. Specifically, from about 0.5 to about 2.0% by weight of wetting agents or surfactants can promote adhesion between the ceramic powder and the binding agent thereby reducing the degree of agglomeration. Suitable wetting agents or surfactants include lignite, mineral oil and low molecular weight waxes. Plasticizers in an amount of from about 1.0 to about 10% by weight decrease the viscosity of the composite to promote mixing. Typical plasticizers include waxes, silicones, alkyl phthalates, polyalkylene (e.g., polyethylene) glycols and linear saturated polyesters. Mold release agents in an amount of from about 0.05 to about 1.0% by weight prevent adhesion to the mold wall thereby facilitating removal of the shaped article from the mold. Typical mold release agents include silicones and various phthalates and amides such as Acrawax C (a fatty acid amide).

To mold the ceramic composition into shaped articles, the selected ceramic powder and dispersed silane treated silicon carbide whiskers are initially dispersed or mixed with the binding agent. Also present at this time are any additives which are to be included in the composition. The mixture is next extruded at a die temperature in the range of from about 90° to about 220° C. and a pressure in the range of from about 500 to about 2,000 psig. Extrusion can be achieved on various pieces of equipment known to those of ordinary skill in the art. For example, the equipment may be a twin-screw extruder operating at a die temperature of about 90° C and a pressure of about 1,200 psig. The composition may be injection molded. Thus, the mixture is heated typically to about 150°-200° C. and injected into a cold mold at a pressure in the range from about 500 to 1,000 psig. The mold temperature is about 70° C. wherein the composition hardens.

To remove the binding agent and any volatile additives, the molded composition is gradually heated. Although the rate of heating to reach final temperature will depend on the amount and type of components in the composition and the characteristics of the article, a typical rate of temperature increase will range of from about 1° to about 20° C. per hour until a temperature in the range of about 500° C. is reached. The selected temperature is then maintained for from about 0.5 to about 2.0 hours.

The temperature is then raised to that required for sintering the ceramic powder. While the rate of final temperature will naturally depend upon the characteristics of the ceramic powder and the shaped article, a rate of temperature increase will generally be in the range of from about a 50 to about 1,000 degrees per hour until a temperature at a range of from about 1,000° to about 1,800° C. is obtained. To fully sinter the ceramic powder, the shaped article is held at final temperature for about 15 minutes to about 8 hours. Sintering is generally undertaken in an atmosphere composed of air or an inert gas. Sintering of the articles results in volumetric reduction of about 15 percent.

EXAMPLE 1

All experiments (Examples 1, 2 and 3) on whisker dispersal were run with the Tateho SCW 1S silicon carbide whiskers as this material exhibited severe agglomeration in the as received condition. In this example, various concentrations of whiskers were dispersed in a silane mixture (described below) or in water and were sonicated in a 100 watt ultrasonic cleaner for 10 minutes. Dispersed material was vacuum filtered through Millipore 0.8 m×47 mm or 0.3 m×25 mm filters. An anti-static spray (Duron) was also tried as a dispersal agent. In this case the mixture was not filtered but dropped on an SEM stub for examination (Sample 7). CPS $Al_2O_3$ powder was also dispersed in water and in the silane mixture, sonicated and filtered (Samples 8 and 9).

The aqueous silane dispersant which was used was prepared with 0.25% methyl trimethoxy silane (Dow Corning 6070), 0.25% cationic lubricant (Cationic X) and acetic acid to pH 4. Data on the preparation and observations of the samples is shown in Table 1.

TABLE 1

| SAMPLE ID | SiC WHISKER DISPERSAL | | |
|---|---|---|---|
| | MIXTURE | FILTER | OBSERVATIONS |
| 1 | 40 mg SiC/ 40 ml silane mixture | 0.8 μm × 47 mm | filter too concentrated, formed a mat of clumped particles |
| 2 | 40 mg SiC/ 40 ml water | 0.8 μm × 47 mm | similar to 2 |
| 3 | 2 mg SiC/ 50 ml silane mixture | 0.8 μm × 47 mm | appears somewhat deagglomerated |
| 4 | 2 mg SiC/ 50 ml water | 0.8 μm × 47 mm | similar to 3 |
| 5 | 2 mg SiC/ 50 ml silane mixture (6 ml filtered) | 0.3 μm × 25 mm | whiskers appear coated - some dispersal |
| 6 | 2 mg SiC/ 50 ml silane mixture (6 ml filtered) | 0.3 μm × 25 mm | whiskers do not appear coated - some dispersal |
| 7 | Duron spray (liquid) | none (brass stub) | Duron film masked whiskers |
| 8 | 2 mg $Al_2O_3$/ 50 ml silane mixture (dilute 1:5) filtered 6 ml | 0.3 μm × 25 mm | Alumina clumps may be deaggregated but filter background similar |
| 9 | 2 mg $Al_2O_3$/ 50 ml water (dilute 1:5) filtered 6 ml | 0.3 μm × 25 mm | similar to 8 |

Results from Table 1 indicate that a concentrated silane dispersant yields a slight improvement in whisker deagglomeration.

EXAMPLE 2

In this second example, the silane mixture of Example 1, ethanol, 0.1% Victawet/water and 0.1% Victawet/ethanol were used as dispersal agents. The dispersed samples were simply dropped onto SEM stubs or glass slides (3 drops each) after sonication, as it was discovered that whiskers on a Millipore filter were difficult to differentiate from the background in the SEM. After drying, the samples were platinum sputter coated in preparation for SEM examination. Data on the preparation and observation of samples is shown in Table 2. Again the aqueous silane dispersant yielded a slight improvement in deagglomeration relative to the water and ethanol dispersants.

TABLE 2

SiC WHISKER DISPERSAL

| SAMPLE ID | MIXTURE | FILTER | OBSERVATIONS |
|---|---|---|---|
| 1 | 7 mg SiC/ 20 ml water (3 drops) | none (brass stub) | dispersed whiskers - some with surface coating, smaller clumps |
| 2 | 7 mg SiC/ 20 ml Victawet/ ETOH (0.1%) (3 drops) | none (brass stub) | not well dispersed - surfaces clean |
| 3 | 7 mg SiC/ 20 ml Victawet/ water (0.1%) (3 drops) | none (brass stub) | somewhat better than in ETOH |
| 4 | 7 mg SiC/ 20 ml water (3 drops) | none (brass stub) | still very clumped whiskers |
| 5 | 7 mg SiC/ 20 ml ETOH (3 drops) | none (brass stub) | still very clumped whiskers |
| 6 | 7 mg SiC/ 20 ml silane mixture (3 drops) | none (Pt/glass) | clumped whiskers - local areas diluted and few clumps |
| 7 | 7 mg SiC/ 20 ml silane mixture (3 drops) | none (glass) | whiskers adhered to glass (removed with tape) |

EXAMPLE 3

In this third example, a greater concentration of SiC whiskers was dispersed in dilute silane mixtures in order to minimize the coating thickness on individual whiskers. Dilution ratios used were 1:5 and 1:2 silane mixture/water CPS-2 Al$_2$O$_3$ powder was also mixed in the dilute reaction mixture and control samples dispersed in water were also prepared at this time. All mixtures were examined using light microscopy (400x Brightfield) prior to SEM examination Data on the preparation and observations of the samples is shown in Table 3.

TABLE 3

SiC WHISKER DISPERSAL EXPERIMENTS - PART III

| SAMPLE ID | MIXTURE | FILTER | OBSERVATIONS |
|---|---|---|---|
| 1 | 28 mg SiC/ 10 ml silane mixture + water (1:5) | brass stub | some agglomeration of short fibers |
| 2 | 28 mg SiC/ 10 ml water | brass stub | badly agglomerated |
| 3 | 28 mg SiC/ 10 ml silane mixture + water (1:2) | brass stub | best dispersion |
| 4 | 145 mg CPS-2 10 ml silane mixture + water (1:5) | brass stub | excellent dispersion |
| 5 | 145 mg CPS-2 10 ml water | brass stub | agglomerated |

As can be seen, diluting the aqueous silane mixture with water provided excellent whisker dispersal.

What is claimed is:

1. In a method of forming a silicon carbide whisker-reinforced ceramic composite wherein silicon carbide whiskers are mixed with ceramic powder and the mixture shaped to form a whisker-reinforced ceramic article and wherein the whiskers readily agglomerate rendering uniform mixing difficult, the improvement comprising: deagglomerating said whiskers prior to or simultaneous with said mixing by dispersing the whiskers in an aqueous silane dispersant comprising effective amounts of a silane, a cationic lubricant and an acid to provide a dispersant pH of from about 3.5-6.0, said silane having the formula $R_n$-SiX$_{4-n}$, wherein R is a nonreactive hydrocarbon group, X is a hydrolyzable group reactive with silicon and n is a integar from 1 to 3.

2. The method of claim 1 wherein said whiskers are deagglomerated in said aqueous silane dispersant prior to mixing with said ceramic powder.

3. The method of claim 1 wherein said whiskers are deagglomerated in said aqueous silane dispersant while being simultaneously mixed with said ceramic powder.

4. The method of claim 2 wherein said deagglomerated whiskers are classified and separated according to size prior to being mixed with said ceramic powder.

5. The method of claim 1 wherein R is a hydrocarbon selected from the group consisting of alkyl, aryl, alkylaryl and arylalkyl.

6. The method of claim 5 wherein said R is alkyl.

7. The method of claim 6 wherein said alkyl group is selected from methyl, ethyl and propyl.

8. The method of claim 1 wherein said hydrolyzable group X is —OR' wherein R' is selected from hydrogen, alkyl, aryl, alkylaryl and arylalkyl.

9. The method of claim 8 wherein said R' is alkyl.

10. The method of claim 9 wherein said alkyl is selected from methyl, ethyl and propyl.

11. The method of claim 1 wherein said silane is mehtyltrimethoxysilane.

12. The method of claim 1 wherein said aqueous dispersant contains from about 0.05 to 1 wt. % of said silane and from about 0.05 to 1 wt. % of said lubricant.

13. The method of claim 12 wherein said aqueous dispersant contains from about 0.05 to 0.25 wt. % of said silane and from about 0.05 to about 0.25 wt %. of said lubricant.

14. The method of claim 12 wherein said aqueous dispersant contains about equal amounts by weight of said silane and said cationic lubricant.

15. The method of claim 1 wherein said whiskers are present in the composite in an amount of from about 5 to about 60 vol. %.

16. The method of claim 15 wherein said whiskers are present in the composite in an amount of from about 5 to about 40 vol. %.

17. The method of claim 16 wherein said whiskers are present in an amount of from about 20 to about 40 vol. %.

18. In a method of forming a whisker-reinforced ceramic composite wherein said whiskers are selected from the group consisting of silicon carbide and silicon nitride and are mixed with ceramic powder and the mixture shaped to form a whisker-reinforced ceramic article and wherein the whiskers readily agglomerate rendering uniform mixing difficult, the improvement comprising: deagglomerating said whiskers prior to or simultaneous with said mixing by dispersing said whiskers in an aqueous silane dispersant comprising an effective amount of a silane, a cationic lubricant and sufficient acid to protonate said lubricant, said silane containing at least one nonreactive hydrocarbon group bonded to the silicon atom of said silane and at least one silicon-bonded group reactive with silicon.

19. The method of claim 18 wherein said whiskers are deagglomerated in said aqueous silane dispersant prior to mixing with said ceramic powder.

20. The method of claim 18 wherein said whiskers are deagglomerated in said aqueous silane dispersant while being simultaneously mixed with said ceramic powder.

21. The method of claim 19 wherein said deagglomerated whiskers are classified and separated according to size to yield whiskers having an aspect ratio about 5–20 prior to being mixed with said ceramic powder.

22. The method of claim 18 wherein said aqueous dispersant contains from about 0.05 to 1 wt. % of said silane and from about 0.05 to 1 wt. % of said lubricant.

23. The method of claim 22 wherein said aqueous dispersant contains from about 0.05 to 0.25 wt. % of said silane and from about 0.05 to about 0.25 wt. % of said lubricant.

24. The method of claim 22 wherein said aqueous dispersant contains about equal amounts by weight of said silane and said cationic lubricant.

25. The method of claim 18 wherein said whiskers are present in the composite in an amount of from about 5 to about 60 vol. %.

26. The method of claim 25 wherein said whiskers are present in the composite in an amount of from about 5 to about 40 vol. %.

27. The method of claim 26 wherein said whiskers are present in an amount of from about 20 to about 40 vol. %.

28. A method of deagglomerating silicon carbide whiskers comprising mixing said whiskers with an aqueous silane dispersant comprising effective amounts of a silane, a cationic lubricant and an acid sufficient to provide a dispersant pH of about 3.5 to 6.0, said silane having the formula $R_n$-$SiX_{4-n}$, wherein R is a nonreactive hydrocarbon group, X is a hydrolyzable group reactive with silicon and n is an integer from 1 to 3.

29. The method of claim 28 wherein R is a hydrocarbon selected from the group consisting of alkyl, aryl, alkylaryl and arylalkyl.

30. The method of claim 29 wherein said R is alkyl.

31. The method of claim 30 wherein said alkyl group is selected from methyl, ethyl and propyl.

32. The method of claim 28 wherein said hydrolyzable group X is —OR' wherein R' is selected from hydrogen, alkyl, aryl, alkylaryl and arylalkyl.

33. The method of claim 32 wherein said R' is alkyl.

34. The method of claim 33 wherein said alkyl is selected from methyl, ethyl and propyl.

35. The method of claim 28 wherein said silane is methyltrimethoxysilane.

36. The method of claim 28 wherein said aqueous dispersant contains from about 0.05 to 1 wt. % of said silane and from about 0.05 to 1 wt. % of said lubricant.

37. The method of claim 36 wherein said aqueous dispersant contains from about 0.05 to 0.25 wt. % of said silane and from about 0.05 to about 0.25 wt. % of said lubricant.

38. The method of claim 36 wherein said aqueous dispersant contains about equal amounts by weight of said silane and said cationic lubricant.

39. A method of deagglomerating silicon-containing whiskers selected from the group consisting of silicon carbide and silicon nitride comprising mixing said whiskers with an aqueous silane dispersant comprising effective amounts of a silane, a cationic lubricant and sufficient acid to protonate said lubricant, said silane containing at least one nonreactive hydrocarbon group bonded to the silicon atom of said silane and at least one silicon-bonded group reactive with silicon.

40. The method of claim 39 wherein said aqueous dispersant contains from about 0.05 to 1 wt. % of said silane and from about 0.05 to 1 wt. % of said lubricant.

41. The method of claim 40 wherein said aqueous dispersant contains from about 0.05 to 0.25 wt. % of said silane and from about 0.05 to about 0.25 wt. % of said lubricant.

42. The method of claim 40 wherein said aqueous dispersant contains about equal amounts by weight of said silane and said cationic lubricant.

43. The method of claim 18 wherein said whiskers are silicon carbide.

44. The method of claim 39 wherein said whiskers are silicon carbide.

45. The method of claim 18 wherein said whiskers are silicon nitride.

46. The method of claim 39 wherein said whiskers are silicon nitride.

47. The method of claim 1 wherein said ceramic powder is alumina or silicon nitride.

48. The method of claim 47 wherein said ceramic powder is silicon nitride.

49. The method of claim 18 wherein said ceramic powder is alumina or silicon nitride.

50. The method of claim 49 wherein said ceramic powder is silicon nitride.

* * * * *